United States Patent
Fuehrer

[11] 3,814,221
[45] June 4, 1974

[54] TRANSMISSION WITH RETARDER AND CONTROL AND LUBRICATION SYSTEM

[75] Inventor: Reece R. Fuehrer, Danville, Ind.

[73] Assignee: General Motors Corporation, Detroit, Mich.

[22] Filed: Dec. 1, 1972

[21] Appl. No.: 311,306

[52] U.S. Cl............... 192/3.34, 192/4 B, 74/732
[51] Int. Cl. ... F16d 67/04, F16h 47/08, F16d 33/12
[58] Field of Search............ 192/3.34, 4 B; 74/732

[56] References Cited
UNITED STATES PATENTS

| | | | |
|---|---|---|---|
| 2,946,416 | 7/1960 | Snoy.................................. | 192/4 B |
| 3,128,642 | 4/1964 | Fisher et al. .................. | 192/4 B X |
| 3,181,677 | 5/1965 | Fisher et al. ..................... | 192/4 B |
| 3,319,746 | 5/1967 | Christenson et al. .......... | 192/3.34 X |
| 3,331,480 | 7/1967 | Christenson et al. ............ | 192/4 B |
| 3,524,523 | 8/1970 | Klimex et al...................... | 192/4 B |
| 3,659,687 | 5/1972 | Edmunds...................... | 192/3.34 X |

Primary Examiner—Samuel Scott
Assistant Examiner—Lance W. Chandler
Attorney, Agent, or Firm—A. M. Heiter

[57] ABSTRACT

A transmission having a torque converter, a hydrodynamic retarder which pumps fluid from the inlet to the outlet and a power shift transmission and a control system having a high regulated main line pressure supplied to the transmission shift control with the overage fluid regulated at an intermediate pressure and connected through the converter and a cooler to the retarder and normal lubrication feed regulated at a low pressure. A manual retarder control valve operative in a retarder on position connects retarder and lubrication feed to the retarder inlet and the retarder outlet to the cooler inlet branch and cooler in a loop circuit back to the retarder feed for autocirculation by retarder pumping action. A positive lubrication supplemental feed valve is normally closed and operative in response to a lower less than minimum lubrication pressure in a signal and make up line opens to connect a restricted main line branch through the signal and make up line to provide supplementary lubrication feed to maintain minimum lubrication pressure. A one way valve prevents this supplementary lubrication feed flowing to the retarder inlet.

5 Claims, 1 Drawing Figure

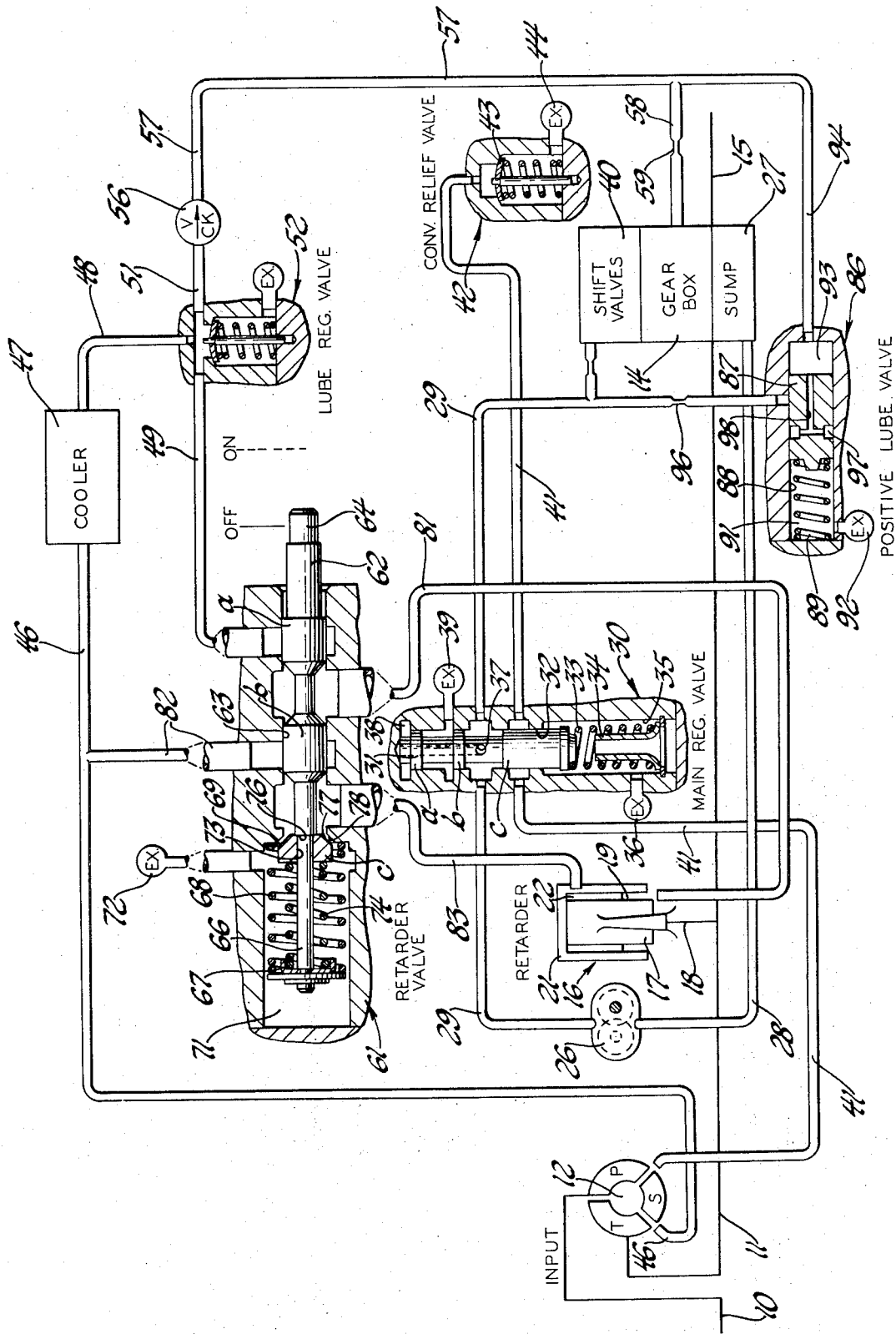

TRANSMISSION WITH RETARDER AND CONTROL AND LUBRICATION SYSTEM

CROSS REFERENCE TO RELATED APPLICATIONS:

This application disclosure relates to Application Ser. No. 311,931 (A-14, 842) filed Dec. 4, 1972 by R. H. Schaefer and R. R. Fuehrer, entitled Transmission with Retarder and Operating Controls.

BACKGROUND OF THE INVENTION

This invention relates to transmissions with lubrication systems and particularly to transmissions with hydrodynamic retarders and lubrication systems.

Transmissions having a hydrodynamic torque converter, a hydrodynamic retarder brake, a lubrication system and control system are known. Such systems as shown in H. W. Christenson et al., U.S. Pat. No. 2,864,473 granted Dec. 16, 1958, M. E. Fisher et al., U.S. Pat. No. 3,138,971 granted June 30, 1964, W. R. Klimex et al., U.S. Pat. No. 3,524,523 granted Aug. 18, 1972, J. O. Edmunds U.S. Pat. No. 3,659,687 granted May 12, 1972 and R. H. Schaefer application Ser. No. 138,655 filed Apr. 29, 1971, now U.S. Pat. No. 3,691,872, circulate fluid from a regulated pressure source through the torque converter to the cooler to provide a fluid supply for the retarder. Retarder on/off valves have in the off position blocked the supply to the retarder and exhausted the retarder and in the on position connected the supply to the retarder and the retarder outlet to the cooler. Such systems also provide a lubrication supply.

BRIEF SUMMARY OF THE INVENTION

This invention provides in a system having a normal higher lubrication feed pressure, a positive feed lubrication make up valve operative in response to less than a lower minimum lubrication pressure in the lubrication feed line transmitted to the positive lubrication valve by a lubrication pressure signal and make up line to open the positive lubrication valve connecting a restricted main line branch through the positive lubrication valve and signal and make up line in bypass relation to the normal higher pressure lubrication supply flow path to the lubrication line to provide supplementary lubrication feed to maintain and regulate lubrication pressure at the lower minimum pressure. This supplementary feed system for a multicomponent hydraulic system having one component, a fluid retarder, normally requiring minimal or no fluid supply and at other times requiring a high flow fluid supply provides for another component, a lubrication system, a normal feed system operative when the one component has minimal feed requirements to make all the overage flow available to supply the other component to provide a large flow to the other component and when the one component has high flow requirements to disable the normal feed and provide a supplementary bypass feed merely meeting minimal requirements of the other component to provide the one component with maximum available flow. The positive lubrication valve and system provides this supplementary lubrication feed in a transmission control system, where a fluid retarder requires, at times during braking, a very high flow fluid supply during quick filling and a quick increase to high speed high capacity braking operation and at other times minimal or no fluid flow during low speed low capacity braking, so a minimum capacity fluid pump may be used and the available pump fluid flow properly apportioned in the system so a minimum size and thus minimum power loss pump may be used. In this system the pump output is connected in series to a plurality of regulator valves with the overage from each valve connected to the next valve in the series. The pump output is regulated by the main regulator valve at a high pressure to supply the transmission shift controls with overage regulated by the converter regulator valve at an intermediate pressure to supply the fluid drive, a torque converter. The torque converter outlet is connected in series through the cooler to provide retarder and lubrication feed regulated by the lubrication regulator valve at a low pressure or high lubrication pressure and overage exhausted. The proper low capacity pump supplies, when the retarder is off, sufficient flow to maintain the high lubrication pressure for maximum lubrication and cooling of the transmission gearing. When the retarder is on and operating at high speed, and brake capacity, the retarder pumping action produces suction and low pressure in the retarder and lubrication feed line providing insufficient or less than minimum lubrication pressure. This low pressure in a lubrication pressure signal and make up line opens the positive lubrication valve at less than the minimum required lubrication pressure to connect the main high pressure through a restricted branch through the positive lubrication valve and lubrication pressure signal and make up line to the lubrication line to maintain a minimum required, and lower than normal, lubrication pressure meeting the lower or minimal transmission lubrication requirements during retarder operation. Thus, make up or supplementary lubrication feed is in parallel to the feed to the torque converter, cooler and retarder and insures maximum available fluid flow to the retarder for quick filling and does not reduce retarder circulation through the cooler to insure proper cooling of retarder flow.

These and other features of the invention will be more apparent from the following description and drawing of a preferred embodiment.

BRIEF DESCRIPTION OF DRAWING

The drawing schematically illustrates the transmission with a hydrodynamic retarder and the control system.

DESCRIPTION

The transmission power train has an input shaft 10 driving the pump P of a conventional three element hydrodynamic torque converter having a grounded stator S and a turbine T driving intermediate shaft 11. The torque converter elements are located in a converter operating chamber 12 supplied with fluid. The shaft 11 is connected by a multiratio power shift transmission or gear box 14 having shift valves 40 and a sump 27 which is of the type disclosed in the above prior art incorporated herein by reference. The transmission drives output or load shaft 15. The hydraulic retarder 16, or brake, has a vaned rotor 17 connected by a hub 18 to rotate with the shaft 11 and is located in a chamber 19 in the fixed stator housing 21 supporting stator vanes 22 and providing the enclosure forming brake chamber 19.

The hydraulic system has an input driven pump 26 which pumps fluid from the transmission sump 27 via suction line 28 and delivers it to the main line 29 at a pressure regulated by the main regulator valve 30. The main line regulator valve 30 is a conventional pressure regulator valve having a valve element 31 with equal diameter lands $a$, $b$ and $c$ reciprocating in bore 32 and biased to closed position shown by spring 33 seated on the seat and stop member 34 fixed in the end of spring chamber bore portion 35 vented by exhaust 36. The main line 29 is connected through the valve bore between lands $b$ and $c$ and through passage 37 restricted for damping to closed chamber 38 at the other closed other end of the bore to bias the valve element against the spring to connect or exhaust main line primary overage to the converter inlet line 41. Further increase in main line pressure will move the valve further connecting secondary overage to exhaust 39. When the pressure in main line 29 is regulated at a high or main line pressure, i.e. 150 psi, by the main regulator valve 30, the main regulator valve delivers the excess fluid or primary overage to the converter inlet line 41 and to converter chamber 12 at an intermediate pressure less than main line pressure, i.e. 80 psi, regulated by the converter feed relief valve 42, having a spring biased valve element 43 which opens to relieve converter excess or overage fluid through exhaust 44 to sump. The converter outlet line 46 is connected to the cooler 47. The cooler is connected by cooler outlet or retarder and lubrication feed line 48 to the retarder feed branch 49 and the lubrication feed branch 51. The cooler outlet, brake and normal lubrication feed pressure is regulated at a low pressure, i.e. 40 psi by cooler out, retarder feed and lubrication feed regulator relief valve 52 constructed like the converter feed relief valve 42 and exhausting excess fluid to sump. The fluid flows from lubrication feed line 51 through the check valve 56 only in a direction to the lubrication supply line 57 to supply fluid through line 58 to the transmission lubrication system. Restriction 59 in line 58 may be a restriction in the lubrication supply line or the restrictions of the lubrication system in the transmission. The fluid used for lubrication returns to sump 27. When the retarder valve 61 is in the off position shown, or is in the on position and the retarder pumping action is low so the pressure drop in retarder and lubrication feed line 48 is low, so the lubrication pressure is not less than a minimum value, i.e. 30 psi lubrication feed is provided as described above from the retarder and lubrication feed line 48 but during filling and high retard braking, dropping lubrication pressure below the minimum value, a supplemental positive lubrication feed is provided as described below.

The retarder valve 61 has a single spool valve element 62 having fixed lands $a$ and $b$ mounted for reciprocating movement with the element in a single bore 63 in the valve body and a movable regulating land $c$ movable with and relative to the valve element. The valve element 62 has a handle portion 64 suitably connected for manual operation and at the opposite end a stem 66 having a spring abutment fixed on the stem and providing a seat for one end of the valve positioning control spring 68 which seats at its other end on shoulder 69 between bore 63 and the large spring chamber bore 71 vented by exhaust 72 to sump. Positioning control spring 68 biased the valve element 62 to the retarder or brake off position shown. The lands $a$ and $b$ are of equal diameter and integral or fixed to the valve element for reciprocating with the valve element in the bore. The land $c$ has a central bore 73 and is slidably mounted on stem 66. A pressure regulating spring 74 located concentrically within spring 68 and coaxially with stem 66 is seated on abutment 67 and engages movable land $c$ to bias land $c$ against stop shoulder 76 on stem 66 to hold regulating land $c$ in the open position shown with the seal portion 77 of land $c$ spaced from the valve seat 76 and thus open when the retarder valve is in the off position. In the retarder valve off position shown, the valve element 62 lands are positioned relative to the port portion of the lines in the valve bore so that land $a$ blocks retarder feed line 49, lands $a$ and $b$ close the retarder inlet line 81, land $b$ blocks the branch 82 of the cooler inlet line 46 and open land $c$ connects the retarder out line 83 between seal portion 77 and valve seat 78 to exhaust 72.

When the retarder valve element 62 is moved to the on position, the retarder out line 83 is first connected between lands $b$ and $c$ to the cooler inlet line branch 82 and cooler inlet line 46 to the cooler 47 and then the retarder feed or inlet line 49 is connected between lands $a$ and $b$ to retarder feed or inlet line 81. The retarder out pressure in line 83 in the space between lands $b$ and $c$ acts on land $c$ against the bias of spring 74 and is regulated by the regulator valve land $c$ of the retarder valve, with overage connected exhaust or overage opening 72, at an increasing regulated pressure proportional to valve element movement as the retarder valve element is moved from off position shown to on position. During the initial phase of this movement providing the above inlet and outlet connections to the retarder shoulder 76 moves permitting land $c$ to move so seal 77 seals on seat 78 under the bias of regulating spring 74 which increases with increasing valve movement to increase the regulated converter outlet pressure. The terminal portion of each of the lines, also called passages, connected to the bore 63 of the retarder valve 61 includes a groove port internally in the above in the valve body.

A positive lubrication feed valve 86 supplements lubrication feed directly from main line 29 if the retarder inlet reduces the retarder and lubrication feed pressure in retarder and lubrication feed line 48 and its branches 49 and 51 below a minimum value so lubrication pressure is below a minimum value. The positive lubrication valve 86 has a valve element 87 reciprocating in bore 88 and biased by spring 89 seated on the end of bore 88 at spring chamber 91 vented by exhaust 92. Spring 89 biases valve element 87 toward chamber 93, at the opposite closed end of the bore. When the lubrication feed pressure in line 57 and branch 94 connected to chamber 93 is sufficient, at and above a minimum value, i.e. 30 psi, this pressure acts on the valve element to move the valve element against the bias of spring 89 to the closed position shown blocking main line restricted branch 96 from groove port 97 and passage 98 connected through the valve element 87 to chamber 93. There is no flow out of chamber 93 as passage 98 is blocked at the bore by valve element 87. If the lubrication feed pressure in lines 57, 94 and chamber 93 is insufficient, below the minimum value, spring 89 moves the valve element 87 to the end of bore 88 at chamber 93 so main line 29 is connected by restricted branch 96, port 97, passage 98 to lubrication line branch 94 and supply line 58 to feed through a restriction 59 the transmission lubrication system to maintain and regulate lubrication pressure at the minimum value, i.e. 30 psi.

During both the retarder off the retarder on operation, the transmission input driven pump 26 supplies main line 29 pressure which is regulated at the high main line pressure, i.e. 150 psi by the main line regulator valve 30 with primary overage connected to the converter feed line 41 which is regulated at an intermediate pressure i.e. 80 psi by the converter supply pressure relief valve with excess fluid exhausted to sump. The main line 29 supplies the transmission shift valves 40 for automatic or manual power shifting the transmission 14. The converter feed line 41 is connected to the converter chamber 12 and the converter chamber outlet is connected to the converter outlet or cooler inlet line 46 through the cooler 47 to the cooler outlet line 48 which has a retarder feed branch 49 and a lubrication feed branch 51 all regulated by cooler outlet, retarder and lubrication feed regulator relief valve 52 at a low pressure, i.e. 40 psi to prevent higher pressure.

The retarder valve 61 in the retarder off position shown blocks the retarder cooler inlet branch 82 so all converter outlet flow flows to the cooler 47 and cooler outlet line 48 and blocks the retarder feed line 49 so cooler out flow in cooler out line 48 is pressure limit regulated by lubrication regulator valve 52 connecting the excess fluid to exhaust and the remainder flows to lubrication feed branch line 51, through check valve 56, lubrication supply lines 57 and 58 and restriction 59 to lubricate the transmission and return to sump. The normal lubrication feed pressure in lubrication supply line 57 regulated by lubrication feed regulator valve 52 will be sufficient so this pressure in branch 94 will close positive lubrication valve 86 as shown blocking supplemental lubrication feed from main line 29 and restriction branch 96. The retarder valve 61 also blocks retarder inlet line 81 and connects retarder outlet line 83 past open land c to exhaust 72.

When the retarder valve 61 is initially moved from retarder off position toward retarder on position, the retarder out line 83 is first connected between lands b and c to cooler inlet branch 82 for the cooler 47, the retarder feed line 49 is then connected to retarder inlet line 81 and retarder out line 83, as land c biased by spring 74 against shoulder 76 is moved with valve element 62 closing the connection to exhaust 72, is disconnected from exhaust. This establishes an autoflow loop circuit from the retarder through the retarder outlet line 83, retarder valve to cooler inlet branch 82, cooler inlet line 46, cooler 47, cooler outlet 48, retarder feed 49 which is connected by the retarder valve to the retarder inlet line 81. Autocirculation in this loop flow path is provided by retarder pumping action overcoming the internal flow restriction of the cooler and other portions of the loop flow path. Regulating land c with regulated retarder out pressure at a low value in the retarder out pressure range, i.e. 0 to 70 psi, for low brake torque and connect excess fluid to relieve pressure to exhaust 72. On progressive movement of the retarder valve element 62 through partial on positions, to the full on position, the spring 74 progressively increases the bias holding land c on the seat 77–78 to regulate retarder out pressure at a gradually increasing pressure value in the retarder pressure range to gradually increase retarder braking effect. In the retarder full on position, the regulator valve land c will regulate at a maximum pressure and limit the torque absorption or braking effect of the retarder and thus function as a brake torque control and limiting valve.

Since, during retarder operation particularly for filling and high braking effect, the rotor 17 acts as a centrifugal pump pumping fluid from the retarder in line 81 to the retarder out line 83, the suction in the retarder inlet line 81 will due to the cooler and line flow restriction, cause the pressure in the cooler out retarder lubrication feed line 48 and its branches, retarder feed line 49 and lubrication feed line 51 to drop from the normal to below the lower minimum lubrication value. Thus in a system that has a pump source having sufficient capacity to meet normal requirements but insufficient capacity to simultaneously meet all system component maximum requirements, such as the normal transmission control system having a normal size transmission single pump, lube system feed line 51 and supply line 57 has less oil at insufficient pressure to meet normal lubrication requirements when the other components have maximum requirements. During normal or brake off low flow requirement operation, the pressure in feed and supply lines 51 and 59 will be regulated by the lube regulator valve 52 at sufficient pressure, i.e. 40 psi, and to normally supply the lubrication system 59.

The lube supply pressure lines 57, 58 will be connected by lubrication pressure signal and make up line 94 to the positive lube valve 86 and act in chamber 93 when sufficient, minimum to normal lubrication pressure, during no or low braking to move the valve element 87 to the position shown closing the feed from main line 29 via restriction 96 to the lubrication system.

During maximum flow requirement brake operation, to provide filling and high brake torque, the pressure in lubrication feed line 51 and supply line 57 is reduced under normal lubrication pressure, 40 psi, and at times to the minimum lubrication pressure, i.e. 30 psi by the suction of retarder pumping and the bias force in chamber 93 will thus be reduced. This permits spring 89 to move valve element 87 to the right at less than the sufficient or minimum lubrication pressure, i.e. 30 psi, opening main line 29 for feed through restriction 96, to the groove 97 and passage 98 in the valve element 87, to feed fluid to lubrication pressure signal and make up line 94 to feed the lube supply line 58. During retarding transmission lubrication requirements are reduced. Under these conditions, valve 86 bleeds a limited but sufficient supply of fluid or oil directly from the main line 29 through restriction 96 and acts as a downstream regulator valve for feed line 51 and supply line 57, regulating at a sufficient minimum lubrication pressure approximately 30 psi to limit pressure reduction in the lubrication feed lines. Thus when the retarder requires maximum flow, transmission lubrication only requires, and is provided with, minimum lubrication pressure and flow. The check valve 56 acts to prevent flow from lubrication supply line 57 to the retarder feed line 51 connected to the retarder inlet line 49 to maintain this minimum lube pressure and prevent this supplemental feed bleed from the main line being connected to the retarder.

The spring 68 provides a return bias returning the retarder valve element 62 from the brake on position to the brake off position when the operator releases the brake apply control or handle portion 64.

It will be appreciated that modifications of the above described invention may be made.

It is claimed:

1. In combination; a drive train; a hydrodynamic retarder having a stator in a retarder chamber with a retarder fluid inlet and outlet and a rotor in said retarder chamber driven by said drive train pumping fluid from said retarder inlet to said retarder outlet and providing braking torque; source means providing a source of fluid at a high regulated pressure; a cooler having an internal flow restriction having an inlet connected to said source means and an outlet providing retarder and lubrication feed; a relief valve connected to said cooler outlet to limit cooler outlet, a retarder and lubrication feed pressure to a low normal value; retarder control valve means having a retarder inlet and outlet passage connected respectively to said retarder chamber inlet and outlet, a cooler inlet and outlet passage connected respectively to said cooler inlet and outlet and an exhaust passage and operative in off position for blocking said cooler outlet passage from said retarder inlet passage, said retarder outlet passage from said cooler inlet passage and connecting one retarder passage to said exhaust passage and operative in one position connecting said cooler outlet passage to said retarder inlet passage at times having high flow reducing cooler outlet pressure below a minimum value less than said low normal value and said retarder outlet passage to said cooler inlet passage; a lubrication supply line connected to said cooler outlet; a restricted flow lubrication system for said drive train connected to said lubrication supply line; a restricted branch connected to said source means; a lubrication pressure signal and make up line connected to said lubrication supply line; a positive lubrication downstream regulator valve means connected to said main line branch and said lubrication pressure signal and make up line operative in closed position in response to minimum and more than minimum lubrication pressure in said lubrication supply line and lubrication pressure signal and make up line to disconnect said restricted branch from said lubrication signal and make up line and operative in response to less than minimum lubrication pressure to open connecting said restricted branch to said lubrication pressure signal and make up line to supply and regulate fluid to maintain said lubrication supply line at minimum lubricating pressure and valve means between said cooler outlet and said lubrication supply line operative to permit flow from said cooler outlet to said lubrication supply lines when the pressure in said cooler outlet is at or above said minimum value and to block flow when the pressure in said cooler outlet is less than said minimum value.

2. In a transmission; a drive train including a torque converter having a converter fluid chamber with a converter inlet and outlet; a hydrodynamic retarder having a stator in a retarder chamber with a retarder fluid inlet and outlet and a rotor in said retarder chamber driven by said drive train pumping fluid from said retarder inlet to said retarder outlet and providing braking torque; source means having a converter feed line, a converter regulator valve, a main line and a main regulator valve connected to said main line regulating main line fluid at a high regulated pressure and providing overage fluid to said converter feed line connected to said converter regulator valve for regulation at an intermediate pressure and connected to said converter chamber inlet; a cooler having an internal flow restriction having an inlet connected to said converter chamber outlet and an outlet providing retarder and lubrication feed; a relief valve connected to said cooler outlet to limit retarder and lubrication feed pressure to a low normal value; retarder control valve means having a retarder inlet and outlet passage connected respectively to said retarder chamber inlet and outlet, a cooler inlet and outlet passage connected respectively to said cooler inlet and outlet and an exhaust passage and operative in off position for blocking said cooler outlet passage from said retarder inlet passage, retarder outlet passage from said cooler inlet passage and connecting one retarder passage to said exhaust passage and operative in on position connecting said cooler outlet passage to said retarder inlet passage at times having high flow reducing cooler outlet passage pressure below a minimum value less than said low normal value and said retarder outlet passage to said cooler inlet passage; a lubrication supply line; a restricted flow lubrication system for said drive train connected to said lubrication supply line; check valve means providing one way flow from said cooler outlet to said lubrication supply line; a restricted main line branch; a lubrication pressure signal and make up line connected to said lubrication supply line and a positive lubrication downstream regulator valve means connected to said main line branch and said lubrication pressure signal and make up line operative in closed position in response to minimum and more than minimum lubrication pressure in said lubrication pressure signal and make up line to disconnect said main line branch from said lubrication signal and make up line and operative in response to less than minimum lubrication pressure to open connecting said main line branch to said lubrication pressure signal and make up line to supply and regulate fluid to maintain said lubrication supply line at minimum lubricating pressure.

3. In a transmission; a drive train including a torque converter having a converter fluid chamber with a converter inlet and outlet and a multiratio transmission having fluid operated shift controls and being drive connected with said torque converter; a hydrodynamic retarder having a stator in a retarder chamber with a retarder fluid inlet and outlet and a rotor in said retarder chamber driven by said drive train pumping fluid from said retarder inlet to said retarder outlet and providing braking torque varying as a function of retarder chamber pressure; source means having a converter feed line, a converter regulator valve, a main line connected to said shift controls and a main regulator valve connected to said main line regulating main line fluid at a high regulated pressure connected to said shift controls and providing overage fluid to said converter feed line connected to said converter regulator valve for regulation at an intermediate pressure and connected to said converter chamber inlet; a cooler having an internal flow restriction having an inlet connected to said converter chamber outlet and an outlet providing retarder and lubrication feed; a relief valve connected to said cooler outlet to limit retarder and lubrication feed pressure to a low normal value; retarder control valve means being a retarder inlet and outlet passage connected respectively to said retarder chamber inlet and outlet, a cooler inlet and outlet passage connected respectively to said cooler inlet and outlet and an exhaust passage and operative in off position for blocking said cooler outlet passage from said retarder inlet passage, said retarder outlet passage from said cooler inlet passage and connecting one retarder passage to said exhaust passage and operative in on position connecting said cooler outlet passage to said retarder inlet passage at times having high flow reducing cooler outlet passage pressure below a minimum value, less than said low normal value and said retarder outlet passage to said cooler inlet passage and controlling retarder chamber pressure; a lubrication supply line; a restricted flow lubrication system for said drive train connected to said lubrication supply line; check valve means providing one way flow from said cooler outlet to said lubrication supply line; a restricted main line branch; a lubrication pressure signal and make up line connected to said lubrication supply line and positive lubrication downstream regulator valve means connected to said main line branch and said lubrication pressure signal and make up line operative in closed position in response to minimum and more than minimum lubrication pressure in said lubrication pressure signal and make up line to disconnect said main line branch from said lubrication signal and make up line and operative in response to less than minimum lubrication pressure to open connecting said main line branch to said lubrication pressure signal and make up line to supply and regulate fluid to maintain said lubrication supply line at minimum lubricating pressure.

4. In a transmission; a drive train including a torque converter having a converter fluid chamber with a converter inlet and outlet and a multiratio transmission having fluid operated shift controls and being drive connected with said torque converter; a hydrodynamic retarder having a stator in a retarder chamber with a retarder fluid inlet and outlet and a rotor in said retarder chamber driven by said drive train pumping fluid from said retarder inlet to said retarder outlet and providing braking torque varying as a function of retarder chamber pressure; source means having a converter feed line, a converter regulator valve, a main line connected to said shift controls and a main regulator valve connected to said main line regulating main line fluid at a high regulated pressure connected to said shift controls and providing overage fluid to said converter feed line connected to said converter regulator valve for regulation at an intermediate pressure and connected to said converter chamber inlet; a cooler having an internal flow restriction having an inlet connected to said converter chamber outlet and an outlet providing retarder and lubrication feed; a relief valve connected to said cooler outlet to limit retarder and lubrication feed pressure to a low normal value; retarder control valve means having a retarder inlet and outlet passage connected respectively to said retarder chamber inlet and outlet, a cooler inlet and outlet passage connected respectively to said cooler inlet and outlet and an exhaust passage and operative in off position for blocking said cooler outlet passage from said retarder inlet passage, said retarder outlet passage from said cooler inlet passage and connecting one retarder passage to said exhaust passage and operative in on position connecting said cooler outlet passage to said retarder inlet passage at times having high flow reducing cooler outlet passage pressure below a minimum value less than said low normal value and said retarder outlet passage to said cooler inlet passage and controlling retarder chamber pressure; a lubrication supply line; a restricted flow lubrication system for said drive train connected to said lubrication supply line; check valve means providing one way flow from said cooler outlet to said lubrication supply line; a restricted main line branch; a lubrication pressure signal and make up line connected to said lubrication supply line; a positive lubrication downstream regulator valve means connected to said main line branch and said lubrication pressure signal and make up line operative in closed position in response to minimum or more than minimum lubrication pressure in said lubrication pressure signal and make up line to disconnect said main line branch from said lubrication signal and make up line and operative in response to less than minimum lubrication pressure to open connecting said main line branch to said lubrication pressure signal and make up line to supply and regulate fluid to maintain said lubrication supply line at minimum lubricating pressure and said positive lubrication valve means having a bore, having a closed chamber end connected to said lubrication signal and make up line, a vented spring chamber end and a port connected to said main line branch intermediate said ends, a valve element having a central recess and an axial passage connecting said recess to one end of said valve element reciprocally mounted in said bore with said one end closing said closed chamber end of said bore, a spring seated in the spring chamber end of said bore biasing said valve element toward said closed chamber end, and said valve element being operative in response to less than minimum lubrication pressure in said closed chamber to overcome said bias spring to align said port and recess to connect said branch line through said port, recess, passage closed chamber and lubrication feed and make up line to supply additional lubricating fluid and in response to minimum and more than minimum lubrication pressure to move said valve element against said spring to misalign said port and recess to disconnect said connection.

5. In a drive train including fluid employing torque control means having a fluid inlet and outlet and having one operating phase having low flow requirements and another operating phase having high flow requirements; source means providing a source of fluid at a high regulated pressure; a cooler having an internal flow restriction having an inlet connected to said source and an outlet providing torque control means and lubrication feed; a relief valve connected to said cooler outlet to limit torque control means and lubrication feed pressure to a low value; control valve means connected to said torque control means inlet and outlet and to said cooler inlet and outlet operative in an on position to provide connections from said cooler outlet to said torque control means inlet and from said torque control means outlet to said cooler inlet and in said other operating phase reducing cooler outlet pressure below a minimum value less than said low normal value and in an off position to block flow through said torque control means, a lubrication supply line connected to said cooler outlet; a restricted flow lubrication system connected to said lubrication supply line; a branch line connected to said source means; lubrication pressure signal and make up line means connected to said lubrication supply line; a positive lubrication downstream regulator valve means connected to said main line branch and said lubrication pressure signal and make up line means operative in closed position in response to minimal lubrication pressure and more than minimal lubrication pressure in said lubrication pressure signal and make up line means to disconnect said branch line from said lubrication signal and make up line means for lubrication feed from said cooler outlet and operative in response to less than minimal lubrication pressure to open connecting said branch line to said lubrication pressure signal and make up line to regulate feed from said source and branch line to maintain said lubrication supply line at minimum lubricating pressure and valve means between said cooler outlet and said lubrication supply line operative to permit flow from said cooler outlet to said lubrication supply lines when the pressure in said cooler outlet is at or above said minimum value and to block flow when the pressure in said cooler outlet is less than said minimum value.

* * * * *